United States Patent [19]

Vandecoevering

[11] 4,109,900
[45] Aug. 29, 1978

[54] CHAINSAW VISE

[76] Inventor: Kenneth E. Vandecoevering, Rte. 4, Box 189, Hillsboro, Oreg. 97123

[21] Appl. No.: 835,034

[22] Filed: Sep. 20, 1977

[51] Int. Cl.² ............................................. B25B 1/24
[52] U.S. Cl. .................................. 269/102; 269/249; 269/266; 269/321 W
[58] Field of Search ............... 269/246, 249, 265, 266, 269/95, 102, 321 W; 51/217 R, 217 P

[56] References Cited

U.S. PATENT DOCUMENTS

| 824,394 | 6/1906 | Warner | 269/266 X |
| 2,469,527 | 5/1949 | Stifflemire | 269/95 |
| 2,529,522 | 11/1950 | Van Scoyk | 269/246 |

Primary Examiner—Robert C. Watson
Attorney, Agent, or Firm—Francis Swanson

[57] ABSTRACT

A vise for making field repairs on chain saws and chain saw parts is disclosed. The vise has two fixed jaws. Between them is a movable jaw. Additional clamping members in the form of wing bolts are threaded through one of the jaws. The vise also has an anvil upon which various repairs or operations such as hammering may be carried out. Protruding from the bottom side of the anvil is a mounting spike. The vise may be mounted horizontally on a stump or vertically on a tree trunk merely by driving the spike in with hammer blows on the anvil. Thus mounted the vise can be pivoted 360° to facilitate positioning of the workpiece.

7 Claims, 5 Drawing Figures

U.S. Patent    Aug. 29, 1978    4,109,900
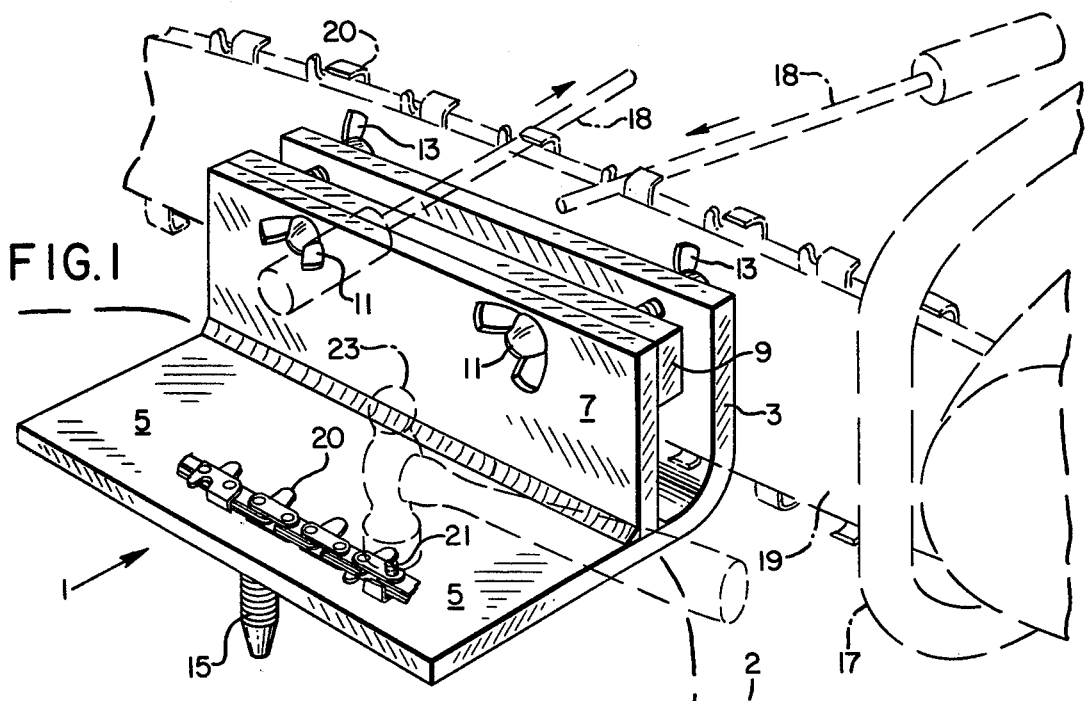
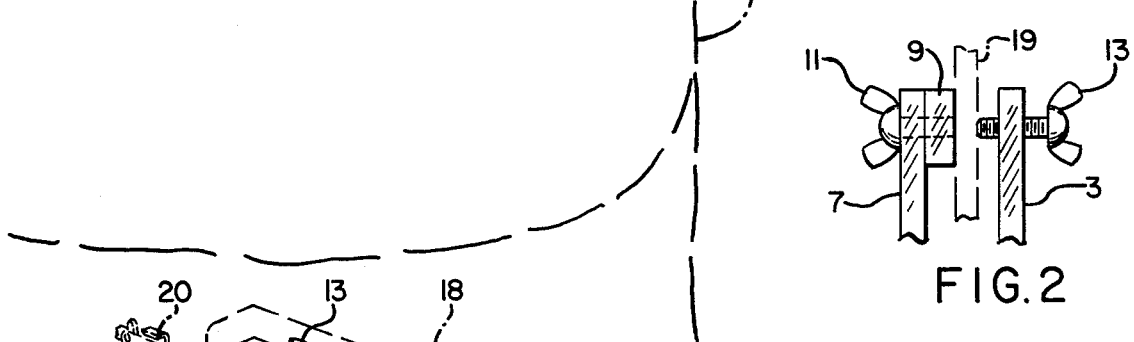
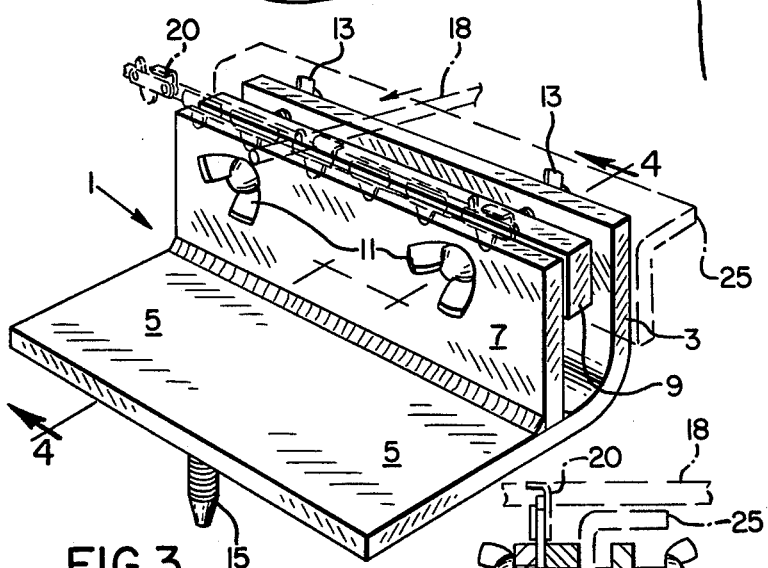
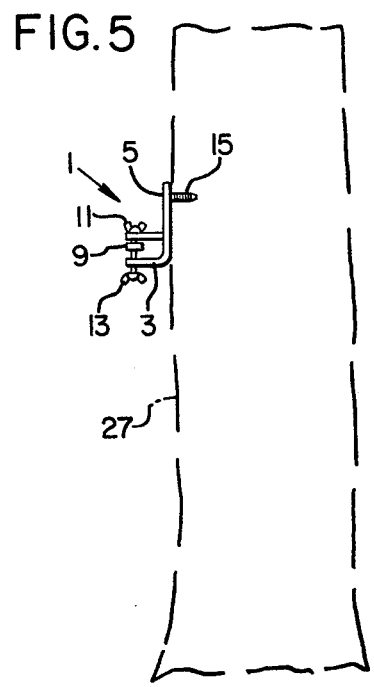
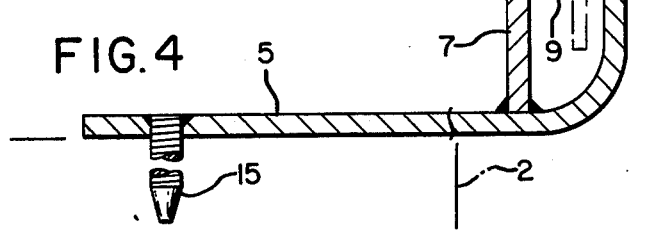

CHAINSAW VISE

BACKGROUND OF THE INVENTION

1. Field of the Invention

The invention pertains to vises generally and more particularly to those especially designed to facilitate chain saw repairs.

2. Description of the Prior Art

Vises are of course well known in the prior art. Conventional construction discloses a firmly mounted base, with the vise itself having a fixed jaw and a movable jaw.

Vises which pivot 360° about a fixed base are also known. Multiple jaw vises exist in the prior art. One such is shown in U.S. Pat. No. 2,535,450 to O'Malley.

These vises are typically heavy and massively constructed. They are difficult to transport by hand and can usually be mounted only horizontally. It is usually not possible to clamp two objects of different sizes simultaneously.

SUMMARY OF THE INVENTION

It is a principal object of the invention to produce a lightweight vise capable of being readily transportable by hand over long distances and rough terrain.

It is a further object of the invention to produce a vise which is capable of clamping at least two objects of differing thickness simultaneously.

A still further object of the invention is to produce a vise which may be quickly mounted in the field on readily available objects.

Other objects and advantages of the invention will be apparent to those skilled in the art with reference to the accompanying drawings and specification.

Brief Description of the Drawings

FIG. 1 is a perspective view of the vise as mounted in the field and showing, in phantom, a saw clamped in the jaws.

FIG. 2 is a partial sectional view taken along line 2—2 of FIG. 1.

FIG. 3 is a perspective view of the vise further illustrating the clamping of a workpiece by the movable jaw.

FIG. 4 is a section view taken along line 4—4 of FIG. 3.

FIG. 5 illustrates the mounting of the vise vertically on the trunk of a tree.

DETAILED DESCRIPTION

Referring now to the drawings, FIG. 1 shows the vise 1 on a stump (shown in phantom). A fixed jaw 3 curves up from and is formed out of frame 5. A second fixed jaw 7 is fixed to frame 5 in spaced-apart relation of fixed jaw 3. A movable jaw 9 is positioned between fixed jaws 3 and 7. The jaw 9 is mounted on fixed jaw 7 by threaded wing bolts 11 which are threaded through jaw 7. A second pair of wing bolts 13 are threaded through fixed jaw 3 but do not attach to movable jaw 9. A mounting spike 15 protrudes from the underside of frame 5. The flat surface of frame 5 can be used as an anvil as shown in FIG. 1.

OPERATION

FIG. 1 shows the vise 1 mounted on a stump 2. Mounting is accomplished by placing spike 15 on the stump 2 and strinking frame 5 sharply with a hammer to drive spike 15 into the wood.

FIG. 1 also shows a saw 17 in phantom. The saw bar 19 is clamped is vise 1 between movable jaw 9, which is drawn flush against jaw 7, and wing bolts 13. FIG. 2 further illustrates the method of clamping.

A file 18 is shown in phantom to illustrate sharpening of chain 20. FIG. 1 also shows a piece of chain 20, in phantom, on frame 5 ready to have chain pin 21 inserted with blows from hammer 23.

FIGS. 3 and 4 shows how movable bar 9 is used to clamp two objects of differing thickness. Chain 20 is clamped between movable jaw 9 and fixed jaw 7 by inserting the chain between the jaws 9 and 7 and rotating wing bolts 11 counterclockwise so as to draw jaw 9 toward jaw 7. A mechanical part 25 is then clamped between jaw 9 and jaw 3 by insertion in the space between the jaws 3 and 9 and rotating wing bolts 13 to move them inward against part 25 forcing it against jaw 9, thus clamping it firmly. Part 25 can of course be removed from vise 1 independently of chain 19 by simply backing off wing bolts 13.

FIG. 5 illustrates the mounting of vise 1 on the trunk 27 of a tree. Mounting is accomplished by driving spike 15 into the trunk 27. It is readily seen from FIGS. 4 and 5 that the vise 1, once mounted, can be rotated 360°, the vise pivoting about spike 15.

Having illustrated the preferred embodiment of my invention with several drawing figures and having described it in detail in the specification, it will be apparent to those skilled in the art that many modifications could be made without departing from the true spirit and scope of the invention. I claim all such modifications as fall within the scope and equivalence of the appended claims.

I claim:

1. A vise for clamping chainsaw parts comprising:
 a frame;
 first and second vertical fixed jaws mounted on the frame in spaced apart relation;
 plural clamping means on the second fixed jaw; a moveable jaw operatively connected to the first fixed jaw, the moveable jaw positioned at least partly within the space between the fixed jaws and independently moveable against the first jaw to clamp a part;
 and a horizontal anvil adjacent the vertical fixed jaws.

2. Apparatus according to claim 1 wherein the plural clamping means comprises a pair of bolts movable through the second fixed jaw.

3. A combination chainsaw parts vise and anvil comprising:
 a horizontal anvil surface;
 first and second vertical fixed jaws on the anvil surface in spaced apart relation;
 a moveable jaw mounted on the first fixed jaw between the first and second fixed jaws, the moveable jaw adjustable to clamp a first part between the moveable jaw and the first fixed jaw;
 a first part clamping bolt on the second fixed jaw, the first bolt adjustable to clamp a second part between said bolt and the moveable jaw;
 and a second part clamping bolt on the second fixed jaw, the second bolt adjustable to clamp a third part of differing thickness from the second part between said second bolt and the moveable jaw.

4. Apparatus according to claim 3 wherein the anvil surface includes vise mounting means.

5. Apparatus according to claim 4 wherein the vise mounting means comprises a spike.

6. A vise for clamping chainsaws comprising:
an L-shaped frame having a vertical member comprising a first fixed jaw and a horizontal member defining an anvil;
a second vertical fixed jaw on the frame in spaced apart opposing relation to the first fixed jaw;
plural independently adjustable bolt means on the first fixed jaw for clamping a part;
and a moveable jaw on the second fixed jaw, the moveable jaw adjustable to clamp in cooperation with either of the plural bolt means or the second fixed jaw.

7. A vise for clamping chainsaw parts comprising:
a frame, the frame defining anvil means;
a first fixed jaw on the frame;
a second fixed jaw on the frame, the fixed jaws mounted in spaced apart relation;
a third jaw moveably mounted on the first jaw;
first and second independently adjustable part clamping bolts on the second jaw, the bolts moveable independent of one another toward the moveable jaw to clamp a part;
and a vise mounting spike on the anvil means.

* * * * *